Aug. 21, 1956   J. S. DANDINI   2,759,761
POWER ACTUATED RETRACTIBLE, RIGID AUTOMOBILE TOP
Filed March 16, 1953
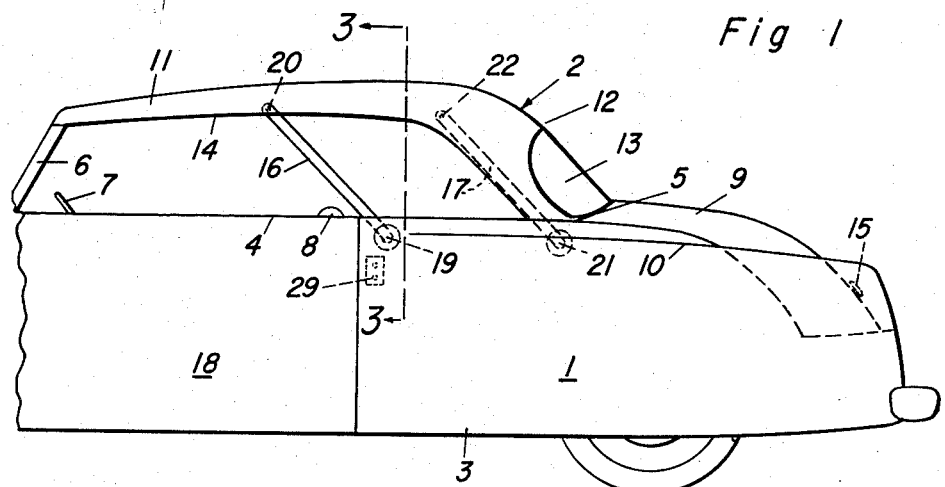
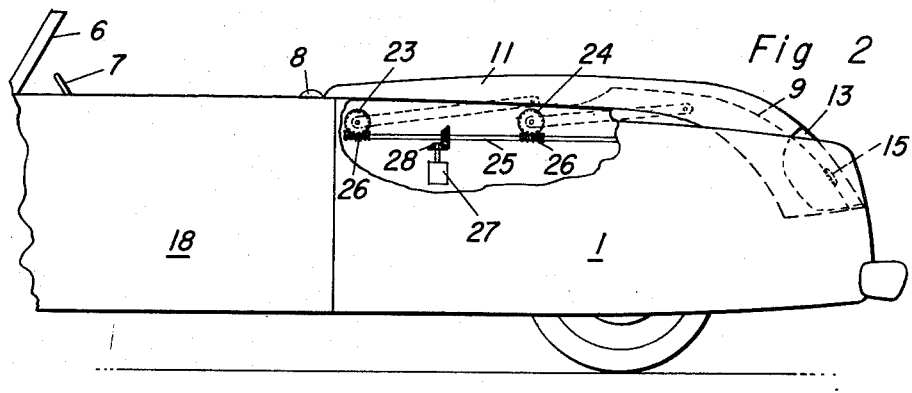
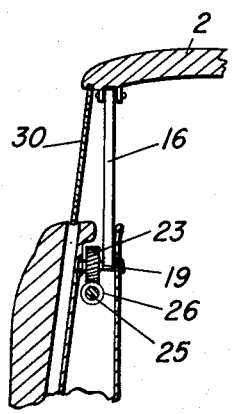
INVENTOR.
Juliana S. Dandini
BY
Att'y

United States Patent Office 2,759,761
Patented Aug. 21, 1956

2,759,761

POWER ACTUATED RETRACTIBLE, RIGID AUTOMOBILE TOP

Juliana S. Dandini, Reno, Nev.

Application March 16, 1953, Serial No. 342,557

2 Claims. (Cl. 296—117)

The present invention relates to improvements in a convertible body for motor vehicles, and its principal object is to provide a real hard top convertible as distinguished from the canvas top convertibles of conventional structure.

More particularly, it is proposed to provide, in a combination of the character described, a rigid top which may be bodily moved, as a unit, from an active position in which it covers the entire body opening, to an inactive position in which it hugs the rear portion of the main body section on a lower level and leaves the front portion entirely unobstructed so as to give a clear view in all directions to the seat occupant.

It is further proposed to provide a supporting means for the rigid top which allows the latter to swing from the active position to the inactive position and vice versa, while maintaining a position parallel to the main body section so that a minimum of space is required for the operation and no tilting of the top is involved.

It is additionally proposed to provide a supporting means for the rigid top which on initiation of the rearward movement from active to inactive position slightly lifts the top with respect to the main body section to free the top at points of contact or anchoring and to clear minor obstacles.

It is further proposed in the present invention, to provide power means for operating the top, the power means being controlled from the inside of the body.

Further objects and advantages of my invention will appear as the specification proceeds, and the new and novel features of my hard top convertible will be fully defined in the claims hereto attached.

The preferred form of my invention is illustrated in the accompanying drawing, forming part of this application, in which:

Figure 1 shows a side view of a motor vehicle body made in accordance with my invention, with the movable top section in up position, the front portion of the body being omitted;

Figure 2, a similar side view, with the top in down position; and

Figure 3, a fragmentary section taken along line 3—3 of Figure 1.

While I have shown only the preferred form of my invention, I wish to have it understood that various changes or modifications may be made within the scope of the claims attached hereto, without departing from the spirit of the invention.

Referring to the drawing in detail, the motor vehicle body is shown as comprising a main body section 1, and a top section 2. The main body section may be of any suitable construction and comprises two spaced side walls 3 arranged in substantially parallel relation and having registering upper edges 4 arranged horizontally to define a top opening for the accommodation of passengers, the rear of the opening being generally indicated at 5.

In the front of the main body section is arranged the conventional windshield 6, with a steering wheel 7 behind the windshield and a front seat 8 behind the steering wheel. Behind the rear of the body section is provided in common practice, a trunk compartment or section 9, which usually is suitably contoured for artistic effect and may have ornamentally designed fenders 10 arranged alongside thereof.

All of these features are more or less conventional, and are of consequence for the present invention only insofar as the shape of the top is concerned, which should be designed to normally cover the body opening from the windshield to the rear edge when in up position, and to fit over the trunk section and the rear portion of the body opening when in down position.

The top 2 comprises in its principal features, a roof-like forward portion 11 and a rear portion 12 curving downwardly from the rear end of the former and generally contoured to fit over the rear of the body opening, as at 5. The rear portion has the rear window 13 therein.

The over-all length of the top is such that, when the rear edge rests on top of the edge 5, the front end bears on or against the top of the windshield, to which it may be fastened by any suitable means conventionally used in connection with canvas tops.

The entire top is made in a single rigid unit and may be constructed of any suitable rigid material, such as metal, plastic or fiberglass.

The top may be curved transversely, as shown, and has side edges 14 disposed over the side edges 4 of the main body section and forming window openings therein. The edges 14 and 4 may run substantially parallel to one another, as shown, but the main desideratum of the shape of the top is that when the top is moved to the rear or down position, the front end of the roof rests directly on the rear end of the body section, while the rear portion of the top is contoured to fit over the trunk section, as shown in Figure 2, leaving a few inches of space to accommodate the handle 15 conventionally provided on the trunk compartment door.

For supporting and operating the top, I provide two pairs of links 16 and 17. The front links 16 are pivoted to the main body section, rearwardly of the doors 18, as at 19, and have their upper ends pivoted to the top, as at 20. When the top is in the normal or up position, the links lean forward, as in Figure 1.

The rear links 17 are pivoted to the main body section rearwardly of the front links, as at 21, and to the top, as at 22, these links running parallel to the links 16, and being preferably of the same length.

The links are operated by means of worm gears 23—24 mounted co-axially with the pivots 19—21 and rigidly secured to the pivots. A shaft 25 on each side of the body has a pair of worms 26 meshing with the worm gears respectively, and the shafts may be operated for rotary movement by means of electric motor 27, and bevel gearing 28, as shown. The motors are reversible and may be controlled for operation in one direction or the other by means of a switch 29 disposed inside the body.

In operation, when the top is disposed in its up position, as in Figure 1, and it is desired to move the top to the down position, the operator merely depresses one of the switch buttons which causes the motor to swing the links 16—17 rearward.

During this movement the links first have to pass through a peak position, with the links disposed vertically, and bodily lift the entire top from its anchorage in the front and in the rear. On continuation of the movement, the links swing downwardly and rearwardly to a near horizontal position, lowering the entire top as a unit to its down position, as in Figure 2, with the front edge of the top adjacent the back of the seat, the sides resting on the sides of the main body section, and the rear of the top contoured about the trunk section.

On reversal of the direction of rotation of the motor, when it is desired to put the top up, the top structure is first lifted by the links, made to pass through the peak, and is then lowered into its position again.

The links are mounted inside the body and suitable windows 30 may be provided in the main body section in accordance with conventional practice.

I claim:

1. A convertible body for a motor vehicle, comprising a main body section having two spaced and hollow side walls, a rigid top section, two sets of registering side links fixedly pivoted to the two sections in longitudinally spaced and parallel relation, and power-operated means on each side of the main body section for operating the links in unison, the latter means comprising worm gears on the lower ends of the links within the side walls and mounted co-axially with the pivots thereof, a shaft on each side of the body adjacent the worm gears and having worms meshing with the worm gears and a motor mounted in each side wall and having driving connection with the shaft, the lower ends of the links and the power-operated means being entirely concealed within the hollow side walls.

2. A convertible body for a motor vehicle, comprising a main body section having two spaced and hollow side walls, a rigid top section, two sets of registering side links fixedly pivoted to the two sections in longitudinally spaced and parallel relation, and power-operated means on each side of the main body section for operating the links in unison, the latter means comprising worm gears on the lower ends of the links within the side walls and mounted co-axially with the pivots thereof, a shaft on each side of the body adjacent the worm gears and having worms meshing with the worm gears and a motor mounted in each side wall and having driving connection with the shaft, the lower ends of the links and the power-operated means being entirely concealed within the hollow side walls, with control means for the power means disposed inside the body.

References Cited in the file of this patent

UNITED STATES PATENTS

| | | |
|---|---|---|
| 1,868,382 | Coadou | July 19, 1932 |
| 2,051,140 | Grimston | Aug. 18, 1936 |
| 2,267,471 | Keller | Dec. 23, 1941 |
| 2,575,864 | Croucher | Nov. 20, 1951 |
| 2,692,162 | Rossmann | Oct. 19, 1954 |

FOREIGN PATENTS

| | | |
|---|---|---|
| 14,449 | Great Britain | Oct. 12, 1915 |
| 420,866 | Great Britain | Dec. 10, 1934 |
| 353,924 | Italy | Nov. 3, 1937 |